(12) United States Patent
Wolff et al.

(10) Patent No.: US 9,541,291 B2
(45) Date of Patent: Jan. 10, 2017

(54) PRESSURE MEASURING GLOW PLUG

(71) Applicant: Robert Bosch GmbH, Stuttgart (DE)

(72) Inventors: Janpeter Wolff, Wurmberg (DE);
Wolfgang Koetzle, Ehningen (DE);
Holger Scholzen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/377,771

(22) PCT Filed: Jan. 22, 2013

(86) PCT No.: PCT/EP2013/051067
§ 371 (c)(1),
(2) Date: Aug. 8, 2014

(87) PCT Pub. No.: WO2013/117417
PCT Pub. Date: Aug. 15, 2013

(65) Prior Publication Data
US 2015/0013633 A1    Jan. 15, 2015

(30) Foreign Application Priority Data
Feb. 10, 2012  (DE) .............. 10 2012 202 061

(51) Int. Cl.
*F23Q 7/00* (2006.01)
*G01L 23/22* (2006.01)

(52) U.S. Cl.
CPC ............. *F23Q 7/001* (2013.01); *G01L 23/22* (2013.01); *F23Q 2007/002* (2013.01); *F23Q 2007/005* (2013.01)

(58) Field of Classification Search
CPC ............. F23Q 7/001; F23Q 2007/002; F23Q 2007/004; F23Q 2007/005; G01L 23/22
See application file for complete search history.

(56) References Cited

U.S. PATENT DOCUMENTS

| 2007/0295710 A1* | 12/2007 | Yamada | F23Q 7/001 |
| | | | 219/270 |
| 2009/0320576 A1* | 12/2009 | Borgers | G01L 23/18 |
| | | | 73/114.18 |
| 2010/0037698 A1* | 2/2010 | Kern | G01L 23/10 |
| | | | 73/715 |

FOREIGN PATENT DOCUMENTS

| DE | 10 2006 008 351 | 8/2007 |
| DE | 10 2008 041 712 | 3/2009 |

(Continued)

OTHER PUBLICATIONS

International Search Report for PCT/EP2013/051067, dated Jan. 22, 2013.

*Primary Examiner* — Jacob Amick
(74) *Attorney, Agent, or Firm* — Norton Rose Fulbright US LLP; Gerard Messina

(57) ABSTRACT

A pressure measuring glow plug includes: a housing in which a heating pin for igniting a combustion mixture of an internal combustion engine and a pressure measuring unit for recording a combustion chamber pressure of the internal combustion engine are situated. The heating pin has a glow current contact for an electric heating element. At the end of the heating pin facing away from the combustion chamber, a pressure transmitting element is fastened, which transmits the combustion chamber pressure acting on the heating pin to the pressure measuring unit. The pressure transmitting element is sleeve-shaped and forms an accommodation space for the glow current contact of the heating element.

10 Claims, 3 Drawing Sheets

(56) References Cited

FOREIGN PATENT DOCUMENTS

| | | | |
|---|---|---|---|
| JP | 2009058156 | A | 3/2009 |
| JP | 2009520942 | A | 5/2009 |
| JP | 2011089688 | A | 5/2011 |
| WO | 2007073998 | A1 | 7/2007 |

* cited by examiner

PRESSURE MEASURING GLOW PLUG

BACKGROUND OF THE INVENTION

1. Field of the Invention

The present invention relates to a pressure measuring glow plug for use in a cylinder head of an internal combustion engine.

2. Description of the Related Art

Such a pressure measuring glow plug is known from published German patent application document DE 102006008351 A1, in which, in a housing, a heating pin, for igniting a combustion mixture of an internal combustion engine, and a pressure measuring unit, having a pressure sensor for recording a combustion chamber pressure of the internal combustion engine, are situated. The heating pin is exposed to the combustion chamber pressure and, as pressure transducer, it transfers the combustion chamber pressure to the pressure sensor, the pressure sensor being prestressed, by a tensioning sleeve, between the heating pin, acting as pressure transducer, and a supporting element having a spring tension of a flexible diaphragm. The tensioning sleeve is connected to the housing, in this context. The heating pin has a glow current contact for an electric heating element accommodated in the heating pin, the glow current contact being contacted to a glow current line. The glow current line is guided through the pressure sensor to a connecting contact on the housing.

BRIEF SUMMARY OF THE INVENTION

The present invention has the advantage that the glow current line is guided outside the pressure sensor. Because of that, the pressure sensor remains uninfluenced by the contacting of the heating pin.

Because the sleeve-shaped pressure transmitting element has a radial recess, sufficient clearance is created for laterally bringing out the glow current line from the accommodation space and for the continuation of the glow current line within the pressure measuring unit, the glow current line being contacted to a high-current contact that is exposed outside the pressure measuring unit. For this purpose, the glow current line is guided in the axial direction within the pressure measuring unit past the pressure sensor and is guided through a duct applied in a supporting element for the pressure sensor, so as to be finally contacted to the exposed high-current contact, outside the pressure measuring device. The exposed high-current contact is expediently developed at an end face of a contacting unit on the side of the glow module.

One expedient embodiment of the pressure measuring glow plug is present if the pressure sensor is prestressed with the spring tension of a flexible diaphragm, the flexible diaphragm being connected to a supporting element, using a tensioning sleeve, at which the pressure sensor is supported at least indirectly. The tensioning sleeve has an outer diameter D2, in this case, which is less than the outer diameter D1 of an outer support section, so that between an inner diameter d1 of the housing and the outer diameter D2 of the tensioning sleeve an encircling gap comes about. This avoids friction between the tensioning sleeve and the housing, which would have an effect on the accuracy of the pressure measurement. This also creates a glow-measuring module and a pressure measuring module in which the mechanical prestressing for the pressure sensor is able to be set outside the housing, whereby the mechanical prestressing of the pressure sensor is not influenced in the later mounting steps during the assembly of the pressure measuring glow plug.

DETAILED DESCRIPTION OF THE INVENTION

Figure 1:
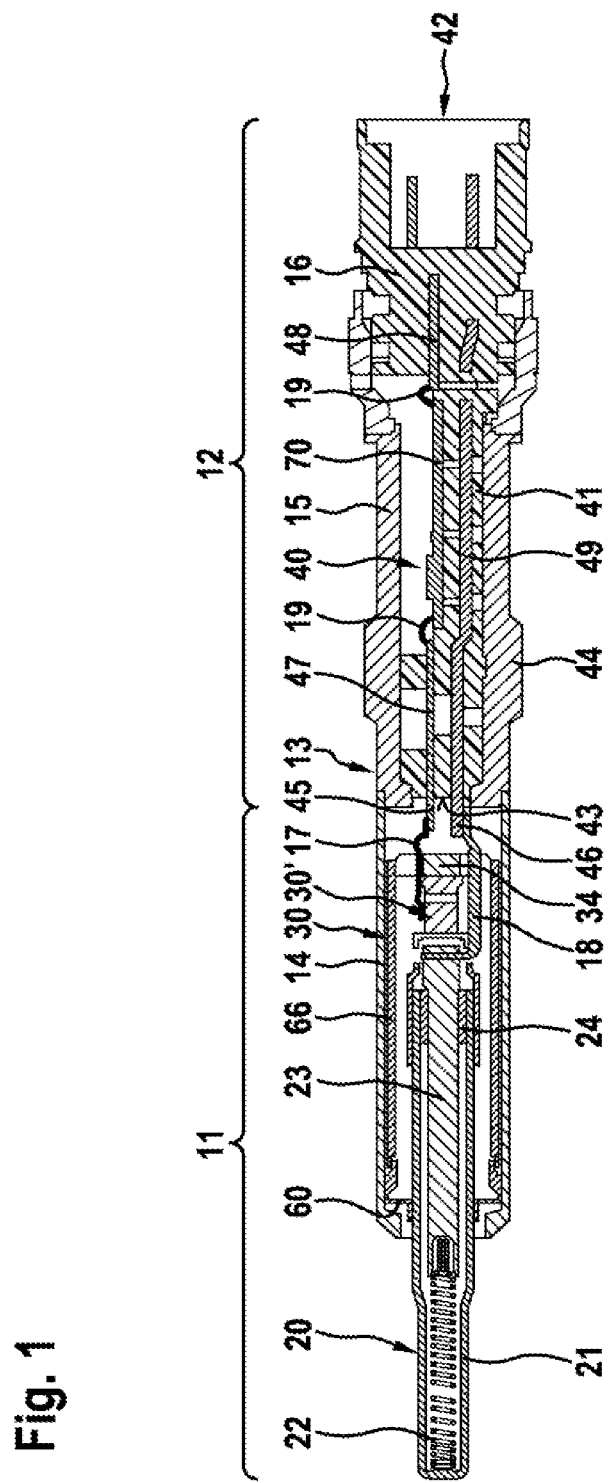
FIG. 1 shows a sectional view through a pressure measuring glow plug according to the present invention.

The pressure measuring glow plug shown in FIG. 1 unifies a conventional glow plug for use in a self-igniting internal combustion engine with an additional pressure measuring function of a pressure measuring device for recording a combustion chamber pressure of the internal combustion engine. The pressure measuring glow plug includes essentially a pressure measuring module 11 and an electronic module 12, which are accommodated at least partially in a multipart housing 13, for example. Housing 13 includes a plurality of housing parts, such as a glow module housing 14, an electronic module housing 15 and a plug housing 16 for an electric plug connection 42 for contacting a connecting plug not shown.

Glow and pressure measuring module 11 includes the actual components of a glow plug 20 for igniting the internal combustion engine and a pressure measuring unit 30 for measuring the combustion chamber pressure. Glow and pressure measuring module 11 includes a heating pin 21 that projects from glow module housing 14 on the combustion chamber side, which projects with the projecting part into the combustion chamber of the internal combustion engine, and thereby forms a pressure transducer for the pressure prevailing in the combustion chamber. In the present exemplary embodiment, heating pin 21 is a metallic glow pipe in which an electric heating element 22 is situated, for instance, in the form of a glow plug filament, heating element 22 being connected to a glow current contact 23, to develop a pole with the glow pipe and for developing the other pole having a glow current contact 23. Glow current contact 23 proceeds in an exposed manner from heating pin 21, in the form of a connecting bolt, at an end face of heating pin 21 facing away from the combustion chamber. Furthermore, between the glow pipe and glow current contact 23, an electrically insulating sealing element 24 is situated. It is also conceivable, however, to make heating pin 21 as a ceramic heating element.

Electronic module 12 has a contacting unit 40, which includes a carrier 41 for accommodating a signal processing unit 70, such as an ASIC, and plug housing 16. Carrier 41 and plug housing 16 are made of an electrically insulating material, such as a plastic, carrier 41 being connected, in an attached form in an axial longitudinal extension, to plug housing 16. Because of that, contacting unit 40 extends in an axial longitudinal extension of the pressure measuring glow plug.

At end face 43 of carrier 41 on the glow module side, contacting unit 40 has an interface for contacting glow and pressure measuring module 11. The interface is formed by exposed glow module-side sensor contacts 45, developed at the glow module-sided end face 43, for contacting pressure sensor 31 and by an exposed glow module-sided high current contact 46 for contacting glow current contact 23, the contacting of pressure sensor 31 taking place via sensor lines 17 and the contacting of glow current contact 23 via a glow current line 18.

Moreover, sensor-sided connecting lines 47 and plug-sided connecting lines 48 are integrated into carrier 41 and into plug housing 16. Provided with a radial distance from the sensor-sided and plug-sided connecting lines 47, 48, there also runs axially through contacting unit 40 an high current line 49, which on the sensor side leads to exposed high current contact 46. On the plug side, high current line 49 leads all the way through plug housing 16 to an high current terminal for the glow current of glow plug 20 on plug connection 42. Sensor-sided and plug-sided connecting lines 47, 48 and/or high current line 49 are expediently cast integrally into carrier 41 and plug housing 16. Expediently, sensor contacts 45 present at the glow module-sided end face 43 are formed by the sensor-sided connecting lines 47 integrated into carrier 41. Accordingly, high current contact 46 that is also present at sensor-sided end face 43 is developed from high current line 49 that is integrated into carrier 41.

The terminals of signal processing unit 70 are contacted in each case using electrical connections 19, to sensor-sided connecting lines 47 and plug-sided connecting lines 48.

Furthermore, contacting unit 40 is at least partially surrounded by pipe-shaped electronic module housing 15, carrier 41 being completely surrounded by electronic module housing 15 and plug housing 16 partially so. On electronic module housing 15 there is an outside thread 44 for screwing it into a cylinder head of the internal combustion engine.

Electronic module housing 15 may, in this case, be developed in one piece or a plurality of pieces.

Figure 2:
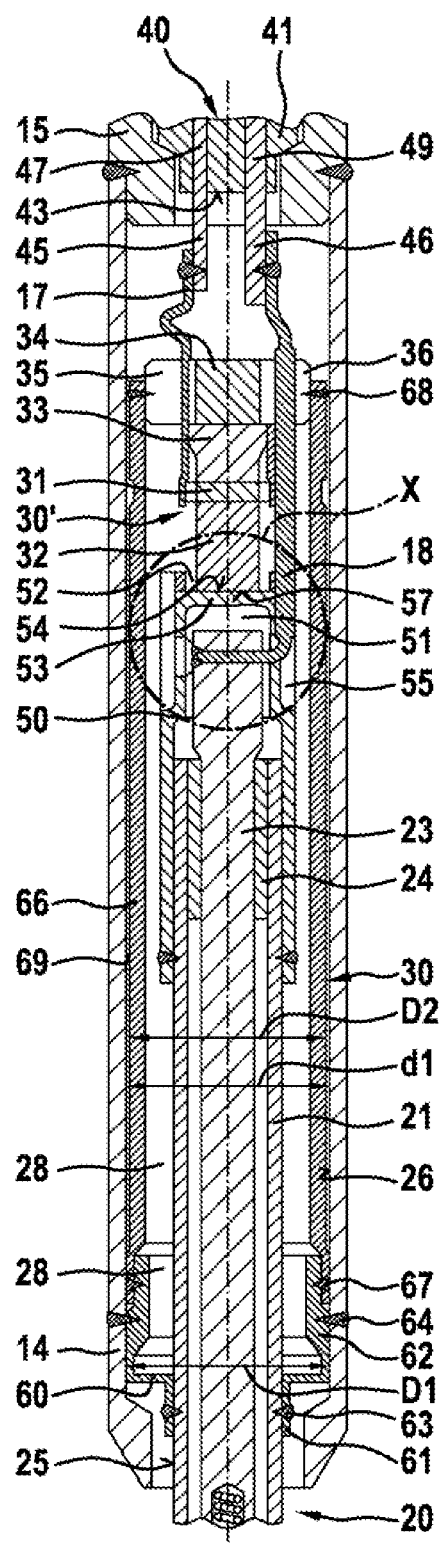
FIG. 2 shows an enlarged sectional view through a glow measuring and pressure measuring module of the pressure measuring glow plug according to the present invention in FIG. 1.
Figure 3:
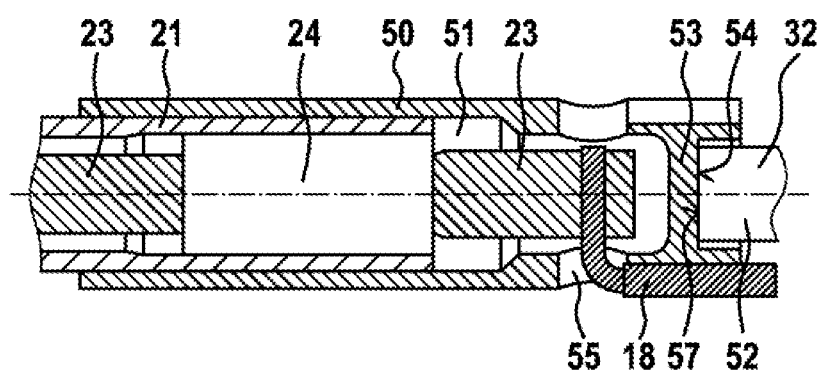
FIG. 3 shows a cutout X in FIG. 2.
Figure 4:
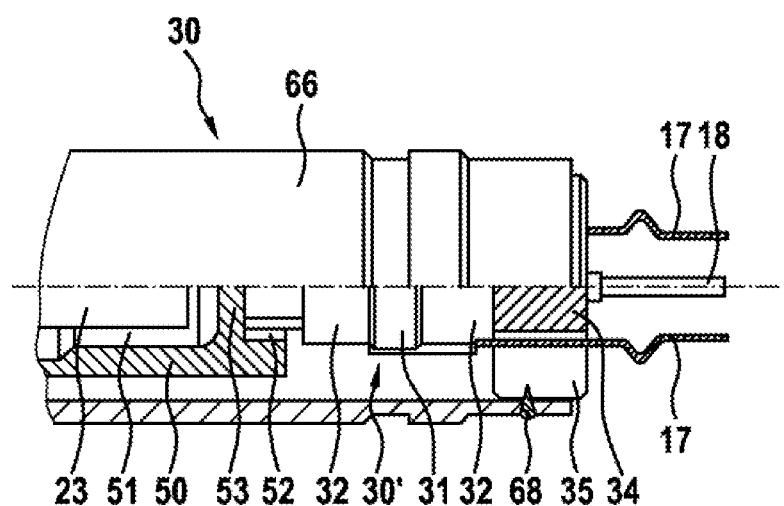
FIG. 4 shows a partial sectional view of an end section of a pressure measuring unit according to FIG. 2, on the supporting element side.

Pressure measuring unit 30 is accommodated inside glow module housing 14, glow module housing 14 having an inside diameter d1 for accommodating pressure measuring unit 20. According to FIG. 2, pressure measuring unit 30 includes a sensor unit 30', a flexible diaphragm 60, a tensioning sleeve 66 and a sleeve-shaped transmitting element 50.

Sensor unit 30' has a piezoelectric pressure sensor 31, a heating pin-sided pressure piece 32, a supporting element-sided pressure piece 33 and a supporting element 34, pressure sensor 31 being positioned between heating pin-sided pressure piece 32 and supporting element-sided pressure piece 33, and is supported on supporting element 34 using supporting element-sided pressure piece 33. Supporting element 34 has first cutouts 35 for guiding through sensor lines 17 and a second cutout 36 for guiding through glow current line 18.

Sleeve-shaped transmitting element 50 is situated around an opening in heating pin 21 facing away from the combustion chamber and is rigidly connected to heating pin 21. Sleeve-shaped transmitting element 50 has a hollow cylinder-shaped accommodation space 51 on the heating pin side and a pressure piece accommodation 52 on the sensor side. Between hollow cylinder-shaped accommodation space 51 and sensor-side pressure piece accommodation 51 a stable separating wall 53 is developed, having a sensor-side supporting area 54. High-current contact 23, with its end facing away from the combustion chamber, projects into accommodation space 51. Within accommodation space 51, glow current contact 23 is electrically connected to glow current line 18. In pressure piece accommodation 52, heating pin-side pressure piece 32 is accommodated, in such a way that it lies with a heating pin-side pressure accommodation area 57 against supporting area 54, without there being a gap.

In the cylinder wall of sleeve-shaped transmitting element 50, at least one radial opening 55 is present, through which glow current line 18 is guided laterally outwards. After the lateral guidance, glow current line 18 essentially has a 90-degree bend, so that glow current line 18 is guided on essentially axially in the direction of high-current contact 46 in the longitudinal extension of pressure measuring unit 30. In the axial direction, glow current line 18 is guided past pressure sensor 31 between sensor unit 30' and tensioning sleeve 66 and guided through duct 36 that is applied in supporting element 34, and thereafter is finally contacted to high-current contact 46 of contacting unit 40. Therefore, after the 90 degree bend, glow current line 18 runs between sensor unit 30' and tensioning sleeve 66 in the axial direction, outside, past the sensor-side section of sleeve-shaped transmitting element 50, past heating pin-side pressure piece 32, past pressure sensor 31 and past supporting element-side pressure piece 33 and all the way through cutout 36 of supporting element 34 to high-current contact 46.

Using flexible diaphragm 60, heating pin 21, that is used as pressure transducer is held resiliently within glow module housing 14. Flexible diaphragm 60 has an inner support section 61 on the heating pin side and an outer support section 62 on the housing side. Flexible diaphragm 60 is fastened, in this context, to inner support section 61 using an encircling first welding seam 63 on an outer side 25 of heating pin 21, and to outer support section 62 using a single encircling, second welding seam 64 on an inner side 26 of glow module housing 14. Second welding seam 64 forms a single fastening location on outer support section 62 for fastening the glow and pressure measuring module 11 within glow module housing 14.

Tensioning sleeve 66 connects flexible diaphragm 60 and supporting element 34 rigidly within glow module housing 14, tensioning sleeve 66 being fastened at one end to flexible diaphragm 60, for instance, using a first welding seam 67, and, at the other end, to supporting element 34, for instance, using a second welding seam 68. Thereby accommodation space 28 is sealed within tensioning sleeve 66, using diaphragm 60, from the combustion chamber of the internal combustion engine. It has turned out to be expedient that, between the outer wall of tensioning sleeve 66 and the inner wall of glow module housing 14, an annular gap 69 is developed.

Tensioning sleeve 66 has an outer diameter D2, in this case, which is less than the outer diameter D1 of an outer support section 62, so that the encircling annular gap 69 between inner diameter d1 of glow module housing 14 and the outer diameter D2 of tensioning sleeve 66 comes about.

Using tensioning sleeve 66, pressure sensor 31 is held in sensor unit 30' between transmitting element 50 and supporting element 34 by prestressing, the prestressing being applied by the spring tension of flexible diaphragm 60. Thereby there is created glow and pressure measuring module 11 as a premountable assembly unit, which includes the components of pressure measuring unit 30 and glow plug 20, and which is contacted to sensor contact 45 and high-current contact 46 of electronic module 12. Subsequently, glow module housing 14 is pushed over the assembly unit mentioned, and welded to electronic module housing 15. Using the sole welding seam 64, glow and pressure measuring module 16 is then fixed to glow module housing 14 by welding outer supporting part 62 of flexible diaphragm 60 to inner wall 26 of glow module housing 14 using a further welding seam (64). By this production sequence it is ensured that the prestressing for pressure sensor 31 is able to be set before final assembly and is not affected by additional assembly steps.

The pressure prevailing in the combustion chamber, which exerts a pressure force on heating pin 21, acting as pressure transducer, has the effect that, based on flexible diaphragm 60, heating pin 21 executes an axial motion with respect to housing 14, along the longitudinal axis. Flexible diaphragm 60 is developed, having a flexural stiffness, in a resilient manner in such a way that heating pin 21 is able to carry out within housing 14 the required axial motion so as to transmit the pressure force exerted on heating pin 21 to pressure sensor 31.

What is claimed is:

1. A pressure measuring glow plug comprising:
   a sleeve;
   a support element attached to the sleeve;
   a heating pin that is configured to ignite a combustion mixture of an internal combustion engine and that includes a heating pin housing that is at least partially within the sleeve, a heating element inside the heating pin housing, and a glow current contact, wherein:
      in a direction extending away from the internal combustion engine, the glow current contact extends from inside the heating pin housing to beyond an end of the heating pin housing, so that a distal end of the glow current contact, which is within the sleeve, is outside of the heating pin housing; and
      the glow current contact is configured to power the heating element at a proximal end of the glow current contact;
   a pressure sensor arranged within the sleeve and between the distal end of the glow current contact and a first side of the support element that faces toward the internal combustion engine;
   a flexible diaphragm attached to the sleeve and attached to the heating pin housing, the heating pin being axially displaceable within the sleeve, under a pressure of the internal combustion engine, by flexure of the flexible diaphragm, wherein the pressure sensor is configured to sense a pressure applied by the heating pin against the pressure sensor due to the axial displacement of the heating pin within the sleeve; and
   a glow current line that (a) at a connection point inside the sleeve, is connected to the glow current contact, (b) extends axially away from the connection point and into and through a first cutout in the support element to beyond a second side of the support element that faces away from the internal combustion engine, passing around the pressure sensor, so that at least a portion of the glow current line is arranged, in a radial direction, between the pressure sensor and the sleeve, and (c) downstream of the support element, with respect to the direction extending away from the internal combustion engine, is configured to electrically connect to a current terminal.

2. The pressure measuring glow plug as recited in claim 1, further comprising a sleeve-shaped pressure transmitting element attached to the heating pin housing and including therein an extension region that, in the direction extending away from the internal combustion engine, is located beyond the end of the heating pin housing, wherein:
   the glow current contact extends from inside the heating pin housing into the extension region of transmitting element beyond the end of the heating pin housing;
   the pressure transmitting element includes, in the extension region, a radial opening; and
   the glow current line extends from inside the extension region radially away from the connection point and through the radial opening to outside the pressure transmitting element and then extends axially towards the cutout in the support element.

3. The pressure measuring glow plug as recited in claim 1, wherein the electrical connection of the glow current line with the current terminal is via an exposed high-current contact provided at an end face of a contacting unit, the contacting unit being arranged in an electronics module housing and the exposed high-current contact extending into a glow module housing that houses the sleeve.

4. The pressure measuring glow plug as recited in claim 1, wherein the support element includes a second cutout for guiding through at least one electrical connection for the pressure sensor.

5. The pressure measuring glow plug as recited in claim 1, further comprising a glow module housing around the sleeve, wherein the flexible diaphragm is fastened to the glow module housing, and the sleeve is fastened to the glow module housing at an opposite end of the sleeve than an end at which the flexible diaphragm is fastened to the sleeve.

6. The pressure measuring glow plug as recited in claim 5, wherein the sleeve has an outer diameter which is less than an outer diameter of the flexible diaphragm in a region at which the flexible diaphragm abuts against the glow module housing, such that an encircling gap is provided between an inner diameter of the glow module housing and the outer diameter of the sleeve.

7. The pressure measuring glow plug as recited in claim 5, wherein, on the flexible diaphragm is fastened to the glow module housing at a single fastening location housing.

8. The pressure measuring glow plug as recited in claim 1, wherein:
   the pressure transmitting element includes a wall;
   the extension region is at a first side of the wall facing towards the internal combustion engine; and
   the pressure measuring glow plug further comprises a first pressure piece that is arranged between the pressure transmitting element and the pressure sensor and that abuts against a second side of the pressure transmitting element facing away from the internal combustion engine.

9. The pressure measuring glow plug as recited in claim 8, further comprising a second pressure piece that is arranged between the pressure sensor and the support element.

10. The pressure measuring glow plug as recited in claim 1, wherein the support element provides a support that prevents the pressure sensor from shifting axially relative to the sleeve under the pressure applied by the heating pin.

* * * * *